United States Patent [19]
Koerfer

[11] Patent Number: 5,635,794
[45] Date of Patent: Jun. 3, 1997

[54] BREAKAGE RESISTANT MERCURY VAPOR LOW-PRESSURE DISCHARGE LAM, PARTICULARLY COMPACT FLUORESCENT LAMP

[75] Inventor: Guenter Koerfer, Zusmarshausen, Germany

[73] Assignee: Patent-Treuhand-Gesellschaft für Elektrische Gluehlampen mbH, Munich, Germany

[21] Appl. No.: 454,621

[22] Filed: May 31, 1995

Related U.S. Application Data

[63] Continuation of Ser. No. 67,522, May 25, 1993, abandoned.

[30] Foreign Application Priority Data

May 26, 1992 [DE] Germany ............... 9207139 U

[51] Int. Cl.$^6$ .................................................. H01J 63/02
[52] U.S. Cl. .................................................. 313/493
[58] Field of Search ...................................... 313/493

[56] References Cited

U.S. PATENT DOCUMENTS

| | | | |
|---|---|---|---|
| 4,184,480 | 1/1980 | Kenny | 126/704 |
| 4,481,442 | 11/1984 | Albrecht et al. | 313/493 |
| 4,558,400 | 12/1985 | Buser | 362/222 |
| 4,853,591 | 8/1989 | Klein et al. | 313/493 |
| 4,881,007 | 11/1989 | Egelstam | 313/493 |
| 4,977,349 | 12/1990 | Asakura et al. | 313/490 |
| 5,233,262 | 8/1993 | Lynn et al. | 313/113 |

FOREIGN PATENT DOCUMENTS

| | | |
|---|---|---|
| 0 061 758 A2 | 10/1982 | European Pat. Off. . |
| 0 296 534 A2 | 12/1988 | European Pat. Off. . |
| WO-A-8 909 487 | 10/1989 | WIPO . |

*Primary Examiner*—Alvin E. Oberley
*Assistant Examiner*—Lawrence O. Richardson
*Attorney, Agent, or Firm*—Frishauf, Holtz, Goodman, Langer & Chick, P.C.

[57] ABSTRACT

To increase the resistance of a tubular compact fluorescent lamp against breakage, particularly at the cross-connecting portion (4) of a U-bent discharge vessel having two leg portions (2, 3), the cross-connecting portion is shaped to have generally parabolic cross section, in which the cross-sectional area of the parabola is about the same as the cross-sectional area of the generally circular leg portions of the U-shaped discharge vessel (1). This provides for better distribution of the glass material of which the discharge tube is made, and hence greater resistance to breakage. The parabolic cross section is terminated at the inner side of the U-bend by an essentially flat, or slightly curved base surface (16), merging with rounded corners (16a) with the parabolic side surfaces. Preferably, the relationship of the radius of curvature ($R_P$) at the apex of the parabola to the radius of curvature ($R_B$) of the transition regions (16a) at the corners between the base (16) and the parabolic side surfaces is between about 0.7 and 1.1. The uniform distribution of wall thickness reduces manufacturing defects and breakages.

12 Claims, 3 Drawing Sheets

_5,635,794_

BREAKAGE RESISTANT MERCURY VAPOR LOW-PRESSURE DISCHARGE LAM, PARTICULARLY COMPACT FLUORESCENT LAMP

This application is a continuation of application Ser. No. 08/067,522, filed May 25, 1993 now abandoned.

Reference to related patents, assigned to the assignee of the present application, the disclosures of which are hereby incorporated by reference:

U.S. Pat. No. 4,481,442, Albrecht et al.
U.S. Pat. No. 4,853,591, Klein et al.

Reference to related application, assigned to the assignee of the present application, the disclosure of which is hereby incorporated by reference:

U.S. Ser. No. 08/054,671, filed Apr. 28,1993, SCHAFNITZEL et al abandoned.

FIELD OF THE INVENTION

The present invention relates to a low-pressure mercury vapor discharge lamp, in which the interior of a discharge vessel is coated with a fluorescent coating, and more particularly to a compact fluorescent lamp, which is so constructed that breakage of the lamp in manufacture or shipping is reduced with respect to prior art lamps.

BACKGROUND

Various types of compact fluorescent lamps use a discharge vessel which is formed of one or more U-bent glass tubes which define a discharge path. If only one glass tube is used, electrodes can be melt-sealed into the two open ends of the U-bent tubes; a plurality of such glass tubes can be assembled, with tubular cross connections between the respective glass tubes to form a continuous discharge path. Electrodes are then melt-sealed in the open ends of the legs of the U-tubes which form the terminal ends of the continous discharge path. Such tubes, customarily, are formed of essentially parallel legs which are then connected at the U-bend by an essentially flat cross-connecting portion so that, in side view, the tubes have an essentially rectangular outer appearance. At the bend, that is, at the transition region of the cross-connecting portion of the U-tube, the spacing of the outer surface with respect to the inner surface is larger than the diameter of the longitudinal legs of the U-tube.

Compact fluorescent lamps, as described, are also patented and reference is made to the U.S. Pat. No. 4,481,442, Albrecht et al, as well as U.S. Pat. No. 4,853,591, Klein et al, assigned to the assignee of the present application, the disclosures of which are hereby incorporated by reference, for detailed descriptions. The cross-connecting portions of these prior art lamps are, usually, somewhat elliptical, and have a major diameter parallel to the legs of the lamp which is slightly larger than that of the diameter of the generally circular leg portions. The entire structure is made by blow-molding, after the respective regions of a continuous glass tube is heated and bent. At the apex of the bend, and particularly at the outer corners of the bend, the thickness of the glass tube has a tendency to vary substantially. Thus, the cross-connecting portion is more sensitive with respect to shocks and vibration than the longitudinal leg portions. It has been found that in mass production of the discharge tubes, in handling, and prior to impact resistant packaging, it is unavoidable that the individual, already bent discharge tubes hit against each other. This may lead to damage and destruction of the discharge tubes, particularly if one cross-connecting portion of a bent discharge tube impinges against the cross-connecting portion at the U-bend of an adjacent discharge tube.

THE INVENTION

It is an object to render the discharge tube of a compact fluorescent lamp resistant to shock, so that the overall resistance to breakage of the lamp is improved, without, however, affecting the light output of the lamp, or the general appearance thereof, or interchangeability with respect to lamps in existing luminaires or fixtures, and particularly to reduce the reject and breakage rate of lamps during production.

Briefly, in accordance with a feature of the invention, the cross-connecting portion of the U-bent discharge tube is so shaped that, in cross section, it is essentially parabolic, and in which the open portion of the parabola is closed off by a flat, straight or slightly curved or bowl-shaped base surface. The transitions region between the base and the parabolic region are curved, to form a smooth transition resistant to the formation of fissures, e.g. upon shock, or cracks, and preventing sharp corners. The dimensions are so selected that the cross-sectional area of the parabolic portion, closed off by the base, of the cross-connecting portion of the U-tube, is at least approximately the same as the cross-sectional area of the longitudinal or leg portions of the discharge tube.

The term "parabolic" or "essentially parabolic" is to be understood to define a shape roughly or generally of a parabola, and not necessarily following a mathematical definition of a parabola.

The arrangement in accordance with the present invention has a cross-connecting portion that is about 0.4 mm thick at the apex and at the outer corners and has a wall thickness of up to 1.4 mm at the inner wall. The wall at the thinnest regions is thus twice as thick as it was with the prior art, somewhat elliptical cross-connecting portion. This substantially increases the resistance to breakage of the cross-connecting portion and reduces stresses and strains within the cross-connecting portion and adjacent transition regions which might arise due to the forming and blow-molding and shaping of an originally longitudinal tube which, then, is formed with sharp bends.

In accordance with a particularly preferred feature of the invention, in which the distribution of wall thicknesses is particularly good, the relationship of the radius of bending of the apex of the parabolic portion, $R_P$ to the bending radius of the rounded corners $R_B$ at the base should be between 0.7 and 1.1. The relationship of the spacing or distance $D_Q$ of the outer surface $M_Q$ from the inner wall of the U-shaped tube, at the bend, to the diameter $D_L$ of the longitudinal leg portions should, preferably, be between about 0.8 and 1.3.

Compact, essentially square-cornered compact fluorescent lamps require cold spots to operate with optimum mercury vapor pressure. These cold spots occur at the outer corners or transition corners between the cross-connecting portion and the longitudinal legs. The cold spots will reliably arise when the relationship of the diameter $D_{LQ}$ at the bend point, or corner, respectively, to the diameter $D_Q$ of the cross-connecting portion is between about 1.1 and 1.3. A preferred ratio is about 1.2.

DRAWINGS

DETAILED DESCRIPTION

Figures 1A, 1B:
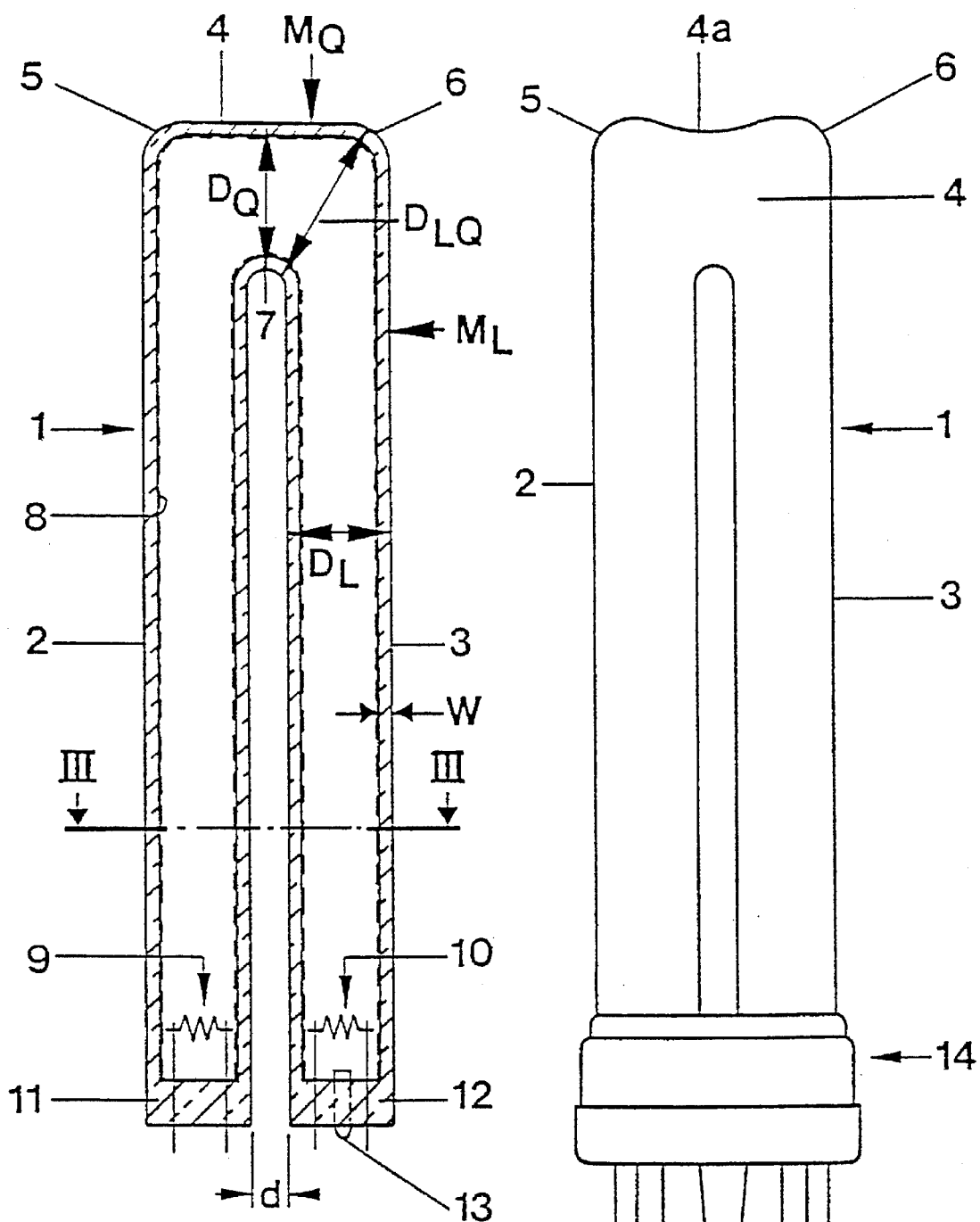
FIG. 1a is a highly schematic longitudinal cross section through a discharge vessel of a compact fluorescent lamp.
FIG. 1b is a side view of the compact fluorescent lamp using the discharge vessel of FIG. 1a, with a base.

Referring first to FIGS. 1a and 1b:

The discharge vessel 1 is formed of a single unitary U-bent tube, having two longitudinal, essentially parallel leg portions 2, 3 of circular cross section and a cross-connecting tubular portion 4. The U-bend of the discharge vessel 1 is so shaped that the outer surface or wall $M_Q$ of the cross-connecting portion 4 is essentially straight and, further, extends at an essentially right angle to the outer surfaces of the walls $M_L$ of the respective longitudinal leg portions 2, 3. The outer diameter $D_L$ of the respective longitudinal leg portions 2, 3 is about 12 mm. The spacing of the wall $M_Q$ from the opposite outer surface of the wall or, respectively, the diameter $D_Q$ of the cross-connecting portion 4 in the center thereof is so selected that the relationship $D_Q/D_L$ is between about 0.8 to 1.3.

The transition of the longitudinal leg portions 2, 3 to the cross-connecting portion 4 which forms corners 5, 6 is so selected that the relationship of the diameter $D_{LQ}$ of the respective bend to the diameter $D_Q$, as defined, is between approximately 1.1 to 1.3. The relationship of the dimensions $D_{LQ}/D_L$ is in the range of between about 1.05 to 1.5. As a result, cold spots will form at the outer corners 5, 6 of the junction between the cross-connecting portion 4 and the legs 2, 3 which, in operation of the lamp, will provide for optimum mercury vapor pressure of about $8 \cdot 10^{-3}$ millibar.

The inner wall is bent over a very small radius, as seen at 7. The clear distance d between the longitudinal leg portions 2 and 3 is less than 5 mm, that is, less than $D_L/2$. Thus, although the discharge tube or discharge vessel 1 is one single continuous element, the lamp is compact, and takes up little space. The inner surface of the tubular discharge vessel 1 is coated with a fluorescent coating 8 which, customarily, is formed of a three-component fluorescent material, providing maximum light output in three spectral bands.

If the lamp is a unitary single-tube construction, then the two ends of the discharge vessel 1 remote from the cross connection 4 have electrodes 9, 10 placed therein, secured in the ends of the lamps by pinch seals 11, 12. One of the tubular ends has a small exhaust-and-fill tube 13 passing therethrough which, after properly filling the interior of the vessel, is tipped off. The fill for the tube is mercury in a quantity of about 10 mg, and 3 mbar argon, forming an ignition gas.

The entire lamp is best seen in FIG. 1b, fitted into a base 14 of standard construction to fit a standard socket. The base 14 may retain a glow starter and a radio noise suppressor, neither of which is shown in the drawing.

Figure 2:
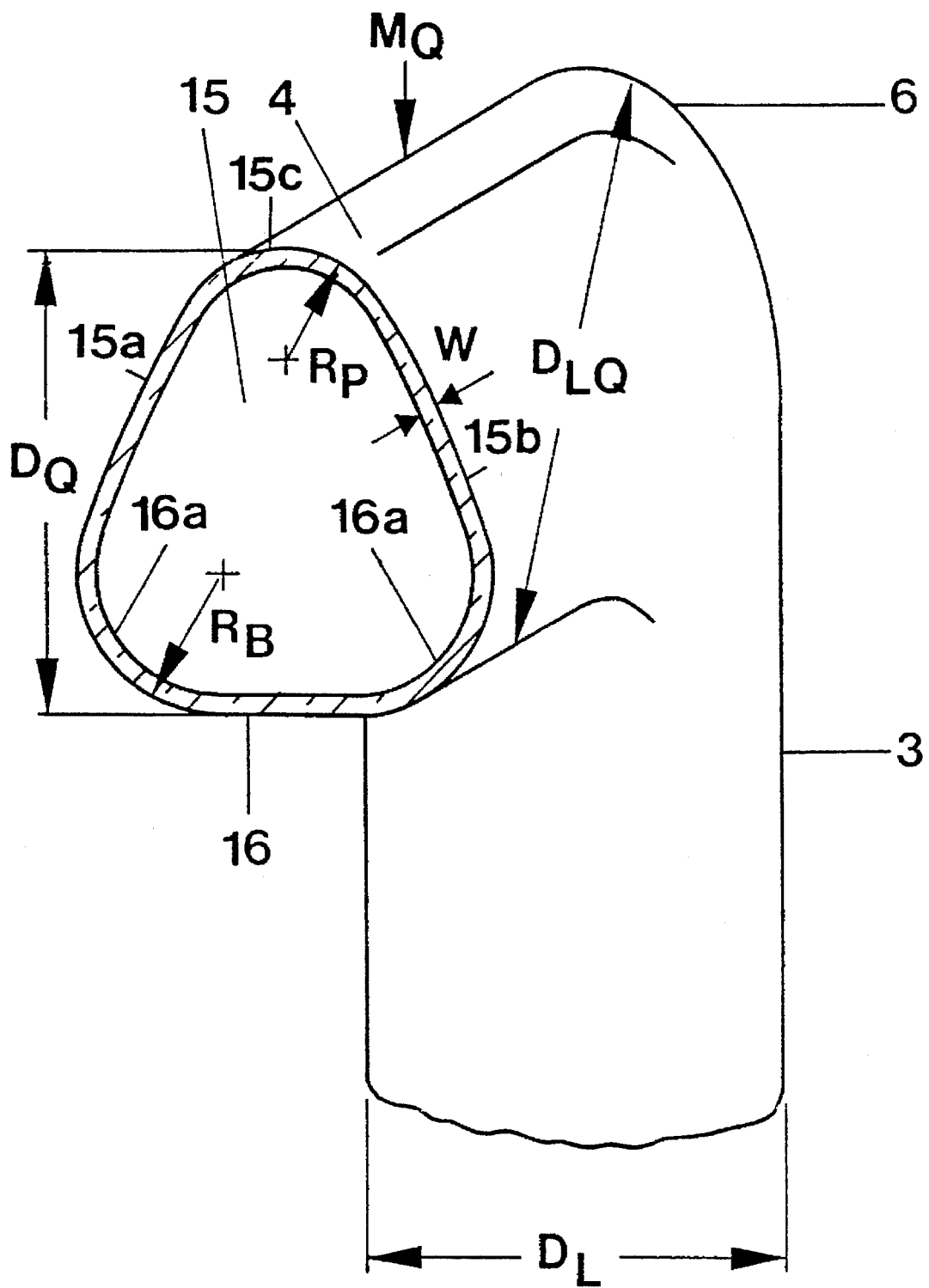
FIG. 2 is a highly schematic perspective part-sectional fragmentary view of the cross-connecting portion of the discharge vessel and the bent corner.

In accordance with the present invention, and as best seen in FIG. 2, the cross connection 4 is not circular in cross section as are the longitudinal leg portions 2 and 3. Rather, it is essentially parabolic in cross section, having an essentially parabolic opening 15, closed off at the bottom by a base 16 which can be flat or slightly curved. The corners 16a where the base 16 meets the sides of the parabola are curved. As seen in FIG. 2, the radii $R_P$ and $R_B$ may be different; it is also possible to so arrange the radius of curvature $R_P$ at the crest of the parabola at 15c, $R_R$ to be the same as the radii $R_B$ at the transition to the base 16. A suitable relationship of the radius $R_P$ to any one of the radii $R_B$ at the rounded corners 16a is between about 0.7 and 1.1, that is, mathematically $R_P/R_B$ is between about 0.7 and 1.1. The diameter $D_{LQ}$ (FIG. 1a) at the corners of the U-tube, that is, at corners 5, 6, is greater than the diameter $D_L$ of the longitudinal leg portions 2, 3. The cross-sectional area of the parabolic cross-connecting portion 4 should be approximately equal to the cross-sectional area of any one of the leg portions 2 or 3.

Figure 3:
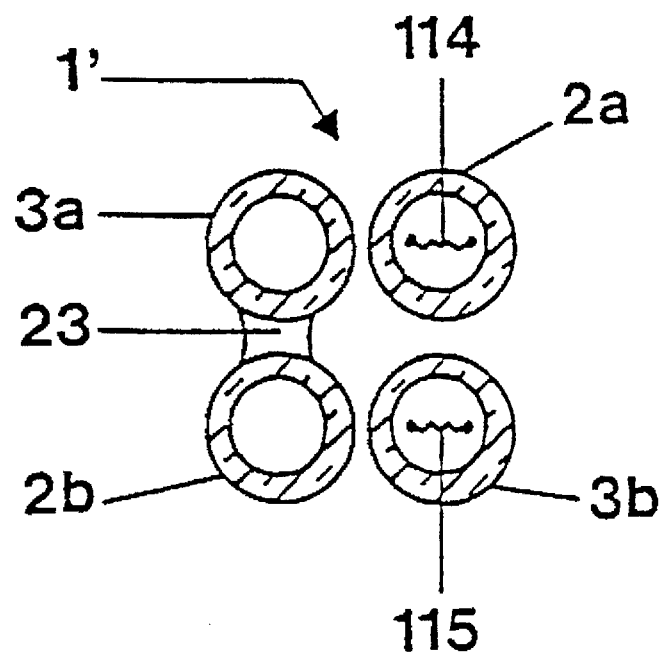
FIG. 3 is a cross section at the line III—III of FIG. 1a, of dual tubes, that is, of a four-leg discharge lamp.

FIG. 3 illustrates a two-tube structure, in cross section. Two identical units are placed side-by-side. The only difference between the units from those shown in FIG. 1a is that each unit will have only one end in which an electrode is located; the other end is connected to the electrode-free end of the adjacent unit by a tubular cross connection 23. In all other respects, the units formed by the longitudinal tubes 2a, 3a and 2b, 3b, with cross-connecting ends 4 (not visible) are as described in connection with FIGS. 1a and 2. Reference is made to U.S. Pat. No. 4,853,591, Klein et al, for details of such lamp constructions. A single discharge path is formed in such lamps from one electrode in one unit, up one leg portion, down the other leg portion, through the tubular cross connection 23, up another leg portion, and down the last leg portion, to the second electrode. Other arrangements, with more than two such units, are possible.

The outer wall $M_Q$ of the cross connection 4 need not be straight but may be formed with a depression 4a (FIG. 1b). This depression has been omitted from FIGS. 1a and 2 for clarity of illustration. This depression forms a small dip with respect to the outer generating line of the outer wall $M_Q$. It extends the region of the coldest spots at the corners 5, 6.

Various changes and modifications may be made within the scope of the inventive concept.

The wall thickness w of cross connection 4 lies between about 0.4 mm and 1.4 mm, whereas a suitable wall thickness W for the wall of the leg portions 2 and 3 is about 1.4 mm.

I claim:

1. Breakage-resistant compact fluorescent lamp, having
   a tubular discharge vessel (1) defining a discharge path, said discharge vessel being formed of a unitary glass tube bent into U shape, and defining two essentially parallel leg portions (2, 3) of essentially circular cross section and an essentially straight cross-connecting portion (4) extending at an essentially right angle between said leg portions (2, 3),
   wherein the transition of said leg portions and said cross-connecting portion (4) of said glass tube forms essentially right angle bends defining outer corners (5, 6);
   said leg portions being sealed at their ends remote from the cross-connecting portion,
   wherein the essentially straight cross-connecting portion (4) defines an outer circumferential surface ($M_Q$) including a top surface (15c) and two side surfaces (15a, 15b), and an inner surface (16);
   wherein, at the outer corners (5, 6) of the bends, the distance ($D_{LQ}$) of the outer circumferential surface ($M_Q$) of the cross-connecting portion (4) from the opposite wall of the U-tube of the discharge vessel (1) is greater than the diameter ($D_L$) of any one of the leg portions (2, 3),
   and wherein
   the cross-connecting portion (4) of the lamp has a breakage resistant shape which is characterized by the cross-connecting portion (4) having a cross section which, generally, is parabolic and comprises said outer circumferential surface ($M_Q$) in general shape of a parabola having a crest or apex region (15c) at said top surface, said cross-connection portion (4) having a closing surface (16) formed by said inner surface of the cross-connecting portion (4), which closing surface, in transverse cross section, is substantially straight or slightly curved and forms rounded connecting corners or transition regions (16a) with the side surfaces (15a, 15b) of the general shape of a parabola; and wherein the cross-sectional area of the cross-connecting portion (4) is at least approximately the same as the cross-sectional area of any one of the leg portions (2, 3) of said discharge vessel (1).

2. The lamp of claim 1, wherein the relationship of the radius of curvature at the apex region of said parabolic cross section to the transition region at said rounded connecting corners (16a) ($R_P/R_B$) is between about 0.7 and 1.1, wherein $R_P$ defines the radius of curvature at the apex of the parabola and $R_B$ defines the radius of curvature at the connecting corners or transition regions (16a) between the closing surface (15a, 15b) (16) and the side surfaces of the essentially parabolic cross-connecting portion (4).

3. The lamp of claim 1, wherein the distance ($D_Q$) from the outer surface ($M_Q$) of the cross-connecting portion (4) from the opposite inner wall (7) of the cross-connecting portion of the U-shaped discharge vessel defines a ratio with respect to the diameter ($D_L$) of any one of said leg portions (2, 3), and said ratio is between about 0.8 and 1.3.

4. The lamp of claim 1, wherein said corners (5, 6) forming the junction between said leg portions (2, 3) and said cross-connecting portion (4) are formed as rounded corners (5, 6); and wherein the maximum distance between any one of the outer corners (5, 6) and the inner wall (7) of the cross-connecting portion is defined by a distance ($D_{LQ}$);

the diameter of any one of said leg portions (2, 3) is defined by the distance ($D_L$); and wherein the ratio ($D_{LQ}/D_L$) is between about 1.05 and 1.5.

5. The lamp of claim 4, wherein said ratio is between about 1.1 and 1.3.

6. The lamp of claim 1, wherein said leg portions (2, 3) connected by said cross-connecting portion (4) are spaced from each other by a clear distance (d); and wherein said clear distance (d) is approximately the same or less than half the diameter ($D_L$) of any one of said leg portions.

7. The lamp of claim 1, wherein a depression (4a) is formed with respect to an outer generating line at the center of the outer circumferential surface ($M_Q$) of the cross-connecting portion (4).

8. The lamp of claim 1, wherein the leg portions at their ends remote from the cross-connecting portions (4) are sealed by a pinch or press seal (11, 12).

9. The lamp of claim 1, further including a fluorescent coating (8) at the interior of the tubular discharge vessel (1).

10. The lamp of claim 1, further including electrodes (9, 10) sealed into the remote ends of the leg portions (2, 3).

11. The lamp of claim 1, wherein said lamp comprises at least two discharge vessels located next to each other; and a tubular cross connection (23) between adjacent discharge vessels is provided to form a continuous discharge path from one of said discharge vessels to an adjacent discharge vessel.

12. The lamp of claim 1, wherein two discharge vessels are provided located next to each other;

each said discharge vessels having one electrode (114, 115) sealed into one remote end of the leg portion of each discharge vessel; and a tubular cross connection (23) between said two discharge vessels is provided close to the sealed ends of those leg portions which do not have an electrode therein.

* * * * *